May 19, 1970
G. K. FARMERY ET AL
3,512,845
LOAD CONTROLLED BRAKING SYSTEM
Original Filed May 24, 1968
4 Sheets-Sheet 1
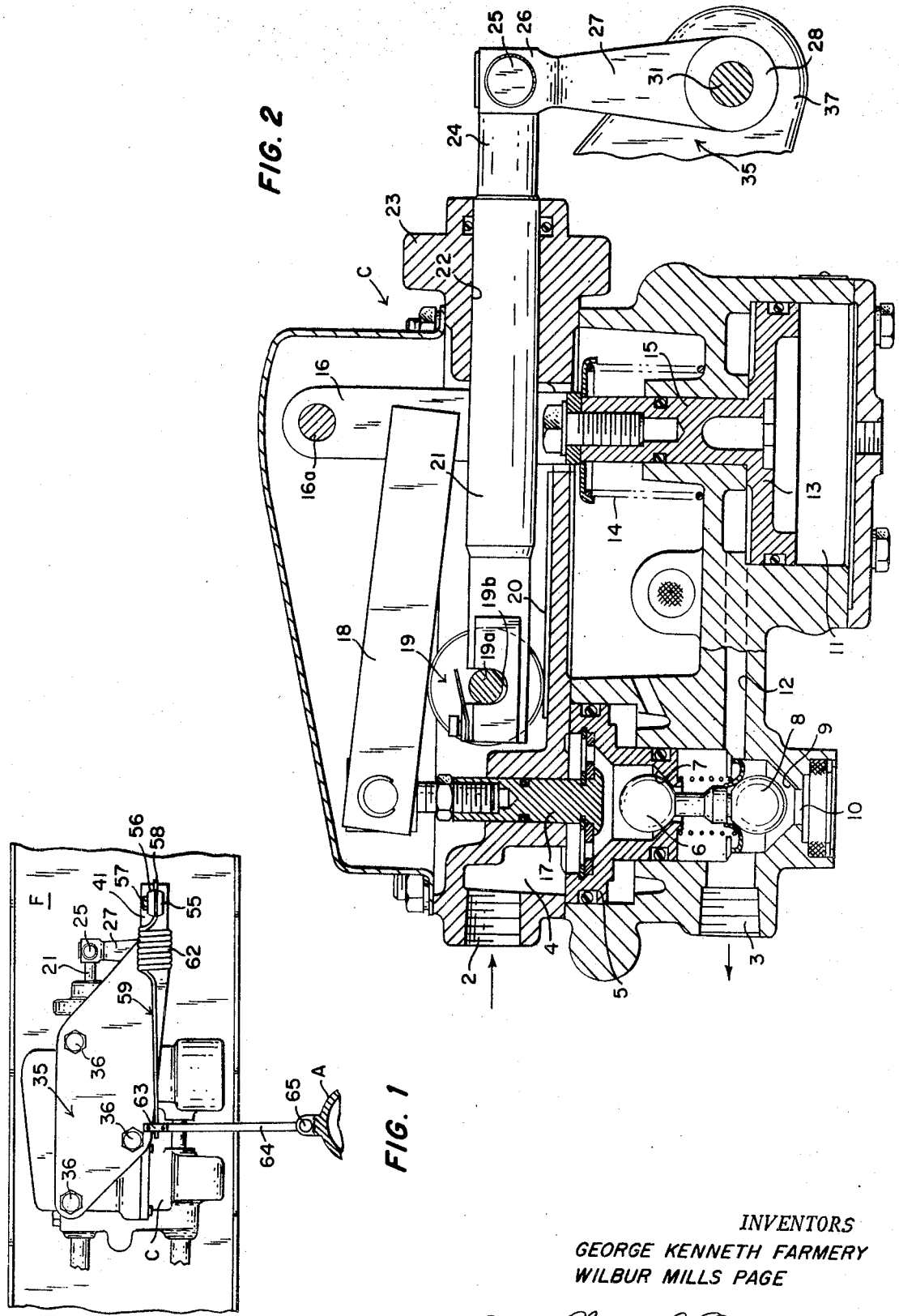
INVENTORS
GEORGE KENNETH FARMERY
WILBUR MILLS PAGE
BY *Norris & Bateman*
ATTORNEYS

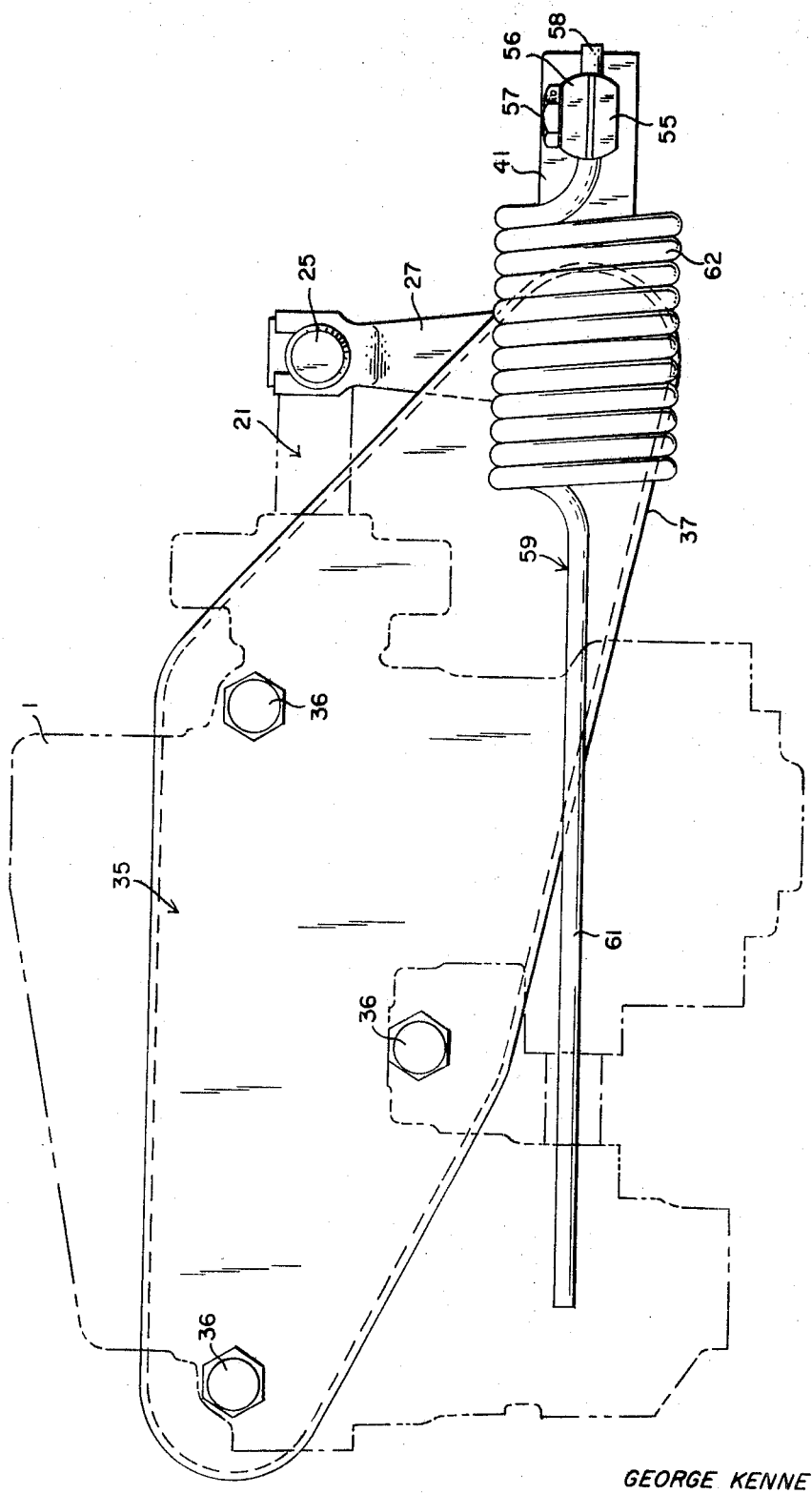

INVENTORS
GEORGE KENNETH FARMERY
WILBUR MILLS PAGE

BY *Norris & Bateman*

ATTORNEYS

INVENTORS
GEORGE KENNETH FARMERY
WILBUR MILLS PAGE

BY  *Norris & Bateman*

ATTORNEYS

United States Patent Office 3,512,845
Patented May 19, 1970

3,512,845
LOAD CONTROLLED BRAKING SYSTEM
George Kenneth Farmery, and Wilbur Mills Page, Lincoln, England, assignors to Clayton Dewandre Company Limited, Lincoln, England, a British company
Continuation of application Ser. No. 731,773, May 24, 1968, which in turn is a continuation-in-part of Ser. No. 658,240; and Ser. No. 658,241, both filed Aug. 3, 1967. This application July 14, 1969, Ser. No. 849,543
Int. Cl. B60t 8/18
U.S. Cl. 303—22                                                                 10 Claims

ABSTRACT OF THE DISCLOSURE

A control valve unit in the fluid pressure brake operating system of a vehicle is mounted on the vehicle frame and directly positively connected by a motion transmitting linkage to a vehicle axle, so that changes in vertical spacing between the frame and axle due to vehicle load are sensed and applied to correspondingly modify the action of the control unit. A fail-safe feature automatically retains adequate control should the linkage break.

---

This application is a continuation of Ser. No. 731,773 filed May 24, 1968 now abandoned, which in turn is a continuation-in-part of applications Ser. Nos. 658,240 and 658,241 both filed Aug. 3, 1967, and now abandoned.

HISTORY AND SUMMARY OF INVENTION

The invention relates to load responsive control units in fluid pressure operated brake systems for roadway vehicles. It is particularly concerned with articulated vehicles, such as tractor-trailer combinations, and in short wheel base vehicles such as tractors wherein rapid deceleration causes transfer of weight toward the front axle, and experience has shown the industry that proportioning of braking with increased braking in front axle and less braking on the driving axle results in better stopping including better control during stopping and less tendency of the articulated vehicle to jacknife. It has also been known that efficiency of the braking performance depends on load and sometimes on load distribution on the vehicle.

The invention relates to control of the fluid pressure braking system in accord with vehicle load factors, and more particularly it comprises a control valve unit on the vehicle frame that is interposed in the fluid pressure brake control circuit and a mechanical linkage connection between a vehicle axle and the control unit whereby changes in vertical level of the frame due to load are positively applied to modify the control action of the unit in the system.

This is a major object of the invention, and furthermore particular objects will appear as they are expressed in details of the claims. An important object of the invention is to provide an automatic resiliently biased fail-safe arrangement whereby, should the linkage break or become ineffective, the valving within the control unit will automatically be set to provide maximum braking action in the system. A more specific object of the invention is to provide flexibility in the linkage so that it does not actuate the control unit when rapidly oscillated as in response to road bumps and other sudden relative vertical displacements of the frame and the axle.

BRIEF DESCRIPTION OF THE DRAWINGS

FIG. 1 is a diagrammatic side elevation showing a brake control valve unit arranged according to a preferred embodiment of the invention;

FIG. 2 is an enlarged elevation in section showing the brake control valve unit connected directly to load sensing means in the vehicle;

FIG. 3 is an enlarged side elevation showing the load sensing arm mounting and connection to the brake control unit;

PREFERRED EMBODIMENTS

Figure 4:
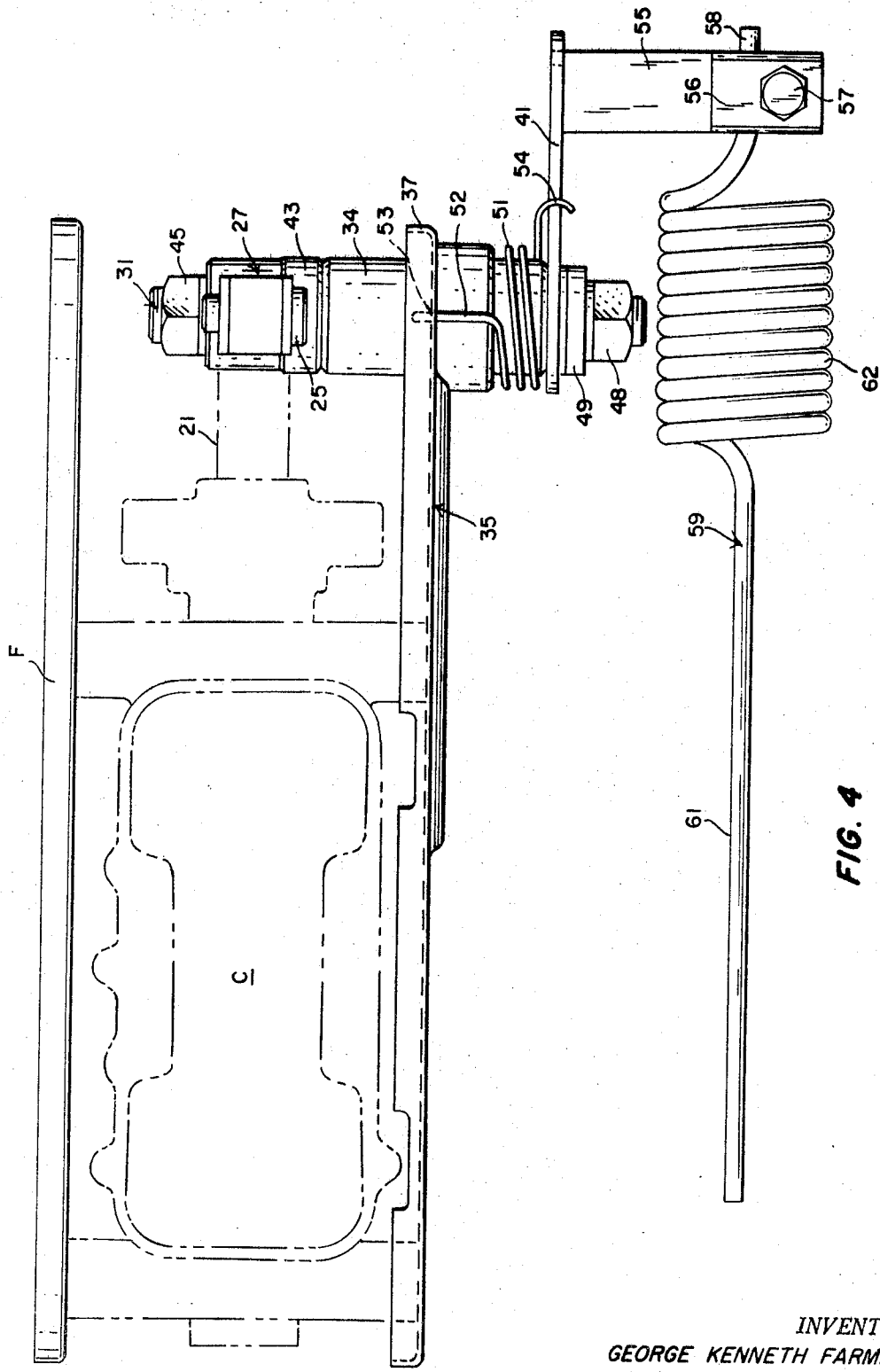
FIG. 4 is a top plan view of the structure of FIG. 3.

FIG. 1 illustrates apparatus for load sensing brake control wherein a control unit C is suitably mounted on a vehicle chassis F and operation thereof is modified by the relative vertical position of the chassis with respect to an axle A in accord with vehicle load. The chassis is of course mounted on the axle structure by usual vehicle spring or pneumatic suspension arrangements (not shown). The axle structure is the usual transverse axle supported at opposite ends by ground engaging wheels (not shown).

Referring first to FIGS. 1 and 2, the control unit therein shown comprises a housing 1 formed with inlet and outlet ports 2, 3 respectively by which the unit is connected into a brake line between the manually-operable brake valve and the brake rotor (not shown), said housing including a chamber 4 which interconnects said ports and in which is located a hollow reciprocable piston 5. Disposed at the lower end of said chamber is a dumb-bell shaped valve assembly, the upper ball valve element 6 cooperating with an annular seating 7 in the piston while the lower ball valve element 8 cooperates with a seating 9 around an exhaust port 10 preferably fitted with an air filter.

A second chamber 11 in the housing on an axis parallel to the first is permanently connected at its upper end by passage 12 to the lower end of the first chamber 4, a balancing piston 13 in said second chamber being urged by springs 14 towards the upper end thereof and being fastened on a stem 15 secured to a vertically-disposed yoke member 16. The piston 5 is carried by a vertical rod 17 which is pivotally attached to one end of a lever or beam 18 the other end of which is located within the opening of the yoke member 16, a roller structure indicated generally at 19 being interposed between the underside of the beam 18 at a point intermediate its ends and a fixed surface or ramp 20 on the housing and constituting the beam pivot or fulcrum. Roller structure 19 freely rotates on a spindle 19a disposed in a recess 19b in a reciprocable rod 21 as will appear. Yoke 16 has a cross member 16a adapted to engage beam 18 under certain conditions as will appear.

With the apparatus as so far described and when in the brakes released condition, the piston 5 is at its upper limit position, the upper dumb-bell valve element 6 is engaging its seating 7 and sealing off the inlet or supply connection 2 from the brake valve while the lower dumb-bell valve element 8 is lifted off its seating 9 so connecting both the outlet or delivery port 3 and the second chamber 11 to exhaust port 10. When pressure is established in the supply line leading to inlet port 2 by operator actuation of the manual brake system valve, the piston 5 and valve assembly 6, 8 is moved downwards, first closing the exhaust port 10 and thereafter opening a passage through the piston 5 to interconnect the supply and delivery ports and so effect operation of the brake motors at the wheels. This movement of the piston 5 rocks the beam 18 about the fulcrum roller 19, sufficient clearance being provided below member 16a in the yoke member 16 to accommodate the rising of the free end of the beam.

A feature of this construction is that during this operation the beam is free to rotate against no-load, resulting in a low "cracking" load and more rapid and controlled build up of air pressure at the brake cylinders. This feature reduces the hysteresis of the unit as a whole and provides a much improved control in the "light" condition. Simultaneously with the supply of pressure fluid to the brake motors, said fluid is conducted through passage 12 to the second chamber 11 and as pressure builds up over the balancing piston 13, the latter moves downwards moving the yoke cross member 16a down to engage beam 18 and so exerting through the yoke member 16 a restoring pressure on the free end of beam 18 which ultimately moves the beam and the piston 5 to a position to cut off further supply of pressure fluid.

Thus it will be seen that the pressure available at the brake motors, expressed as a percentage of the pressure in the brake supply line, is determined by the relative areas of the two pistons 5, 13 and the relative lengths of the two arms of the beam 18 at opposite sides of fulcrum 19 and a feature of the invention is the modification of the relative beam arm length in substantially direct proportion to vehicle load.

Control rod 21 is slidably mounted in a bore 22 in a bushing 23 fixed to housing 1, and its free end is a preferably reduced flat sided portion 24 outside the housing as shown in FIG. 2. Rod 21 is disposed generally horizontally to extend longitudinally of the vehicle, and the axis of freely rotatable roller fulcrum spindle 19a moves with rod 21 parallel to ramp 20.

At its free end rod 21 is pivotally connected by a transverse pivot pin 25 extending between the arms of a clevis 26 to the upper end of a lever 27.

At its lower end (FIG. 5) lever 27 has a hub 28 non-rotatably mounted at 29 on one end of a stub shaft 31 that is rockably mounted on bearings 32 within the bore 33 of a tubular support 34 secured to a frame bracket 35, so that support 34 is rigid with housing 1 and the vehicle frame.

As shown in FIGS. 1 and 3, bracket 35 is attached to housing 1 as by a series of bolts 36, and support 34 (FIG. 5) is press fitted within a bracket aperture within the projecting bracket nose section 37. Oil seals 38 and 39 are provided around shaft 31 within the opposite ends of support 34.

The pivot axes at 25 and 31 are parallel and perpendicular to the direction of reciprocation of rod 21.

Figure 5:
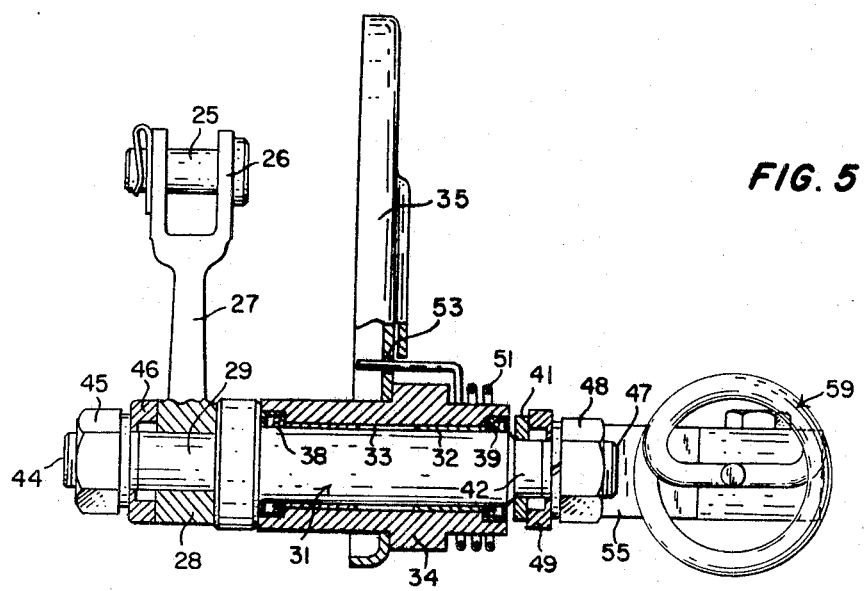
FIG. 5 is an end view partly broken away and in section showing the structure at the load sensing arm pivot.

Referring to FIGS. 4 and 5, a lever 41 is non-rotatably mounted at 42 on the other end of stub shaft 31, and lever 41 extends rearwardly away from the control unit, at about right angles to lever 27, so that in effect the levers 27 and 41 and shaft 31 constitute a bell crank.

A thrust bearing unit 43 is interposed between one end of support 34 and the lever hub 28. The adjacent end of shaft 31 is threaded at 44 to mount a lock nut and washer assembly 45 which when tightened clamps a collar 46 against hub 28. Thus lever 27 is axially fixed on shaft 31.

At its other end shaft 31 is threaded at 47 to mount a lock nut and washer assembly 48 which when tightened clamps a collar 49 against lever 41. Thus lever 41 is axially fixed on shaft 31.

A coil spring 51 has one end 52 anchored in aperture 53 in bracket 35 and its other end terminates in a hook 54 extending over the upper edge of lever 41. The body of spring 51 loosely surrounds stationary support 34, and normally spring 51 urges lever 41 and consequently the entire bell crank to rock clockwise (FIG. 1) for a purpose to appear.

Fixed on the outer end of lever 41 is an arm 55 which projects outwardly at right angles to lever 41. At its outer end arm 55 is formed to mount a clamp plate 56 adapted when bolt 57 is tightened to anchor the rear end 58 of a relatively stiff spring rod 59 rigidly to arm 55. The forward end 61 of spring rod 59 is coaxial with rear end 58, and between these ends the relatively stiff spring wire that comprises rod 59 is formed into a coil 62 coaxial with the rod ends. The function of coil 62 is to absorb sudden and transient shocks, as due to road unevenness, and isolate them from the control unit C.

Spring rod 59 which extends generally horizontally longitudinally of the vehicle has its forward end secured as by a clamp 63 (FIG. 1) to the upper end of a motion transmitting arm 64 pivoted at its lower end at 65 on axle A.

Preferably arm 64 is disposed to extend vertically in centered relation to the axle so as not to be affected by asymmetrical loading of the vehicle. In tandem axle suspension arrangements this arm is centered with one or the other of the axles.

In operation when due to load change there is relative vertical movement between frame F and the axle A, the bell crank system is rocked by spring rod 59 about the axis of shaft 31 to displace control rod 21 and thereby reposition the fulcrum 19 of lever 18 to modify the brake control action in accord with the vehicle load.

When the parts are assembled rod 59 is rocked down to the generally horizontal position shown in FIG. 1 and attached at 63 to arm 64. This rocks the lever means 41 counterclockwise, and the spring 51 is tensioned to an energized condition wherein it biases lever means 41 clockwise. Now, should the connection 63 break or the motion transmitting mechanism become similarly ineffective, spring 51 will immediately act as a fail safe control to rock lever means 41 clockwise to thereby (FIG. 2) displace fulcrum 19 to the right to set the control unit automatically for maximum braking whenever the operator applies the brakes in the normal manner.

Figure 6:
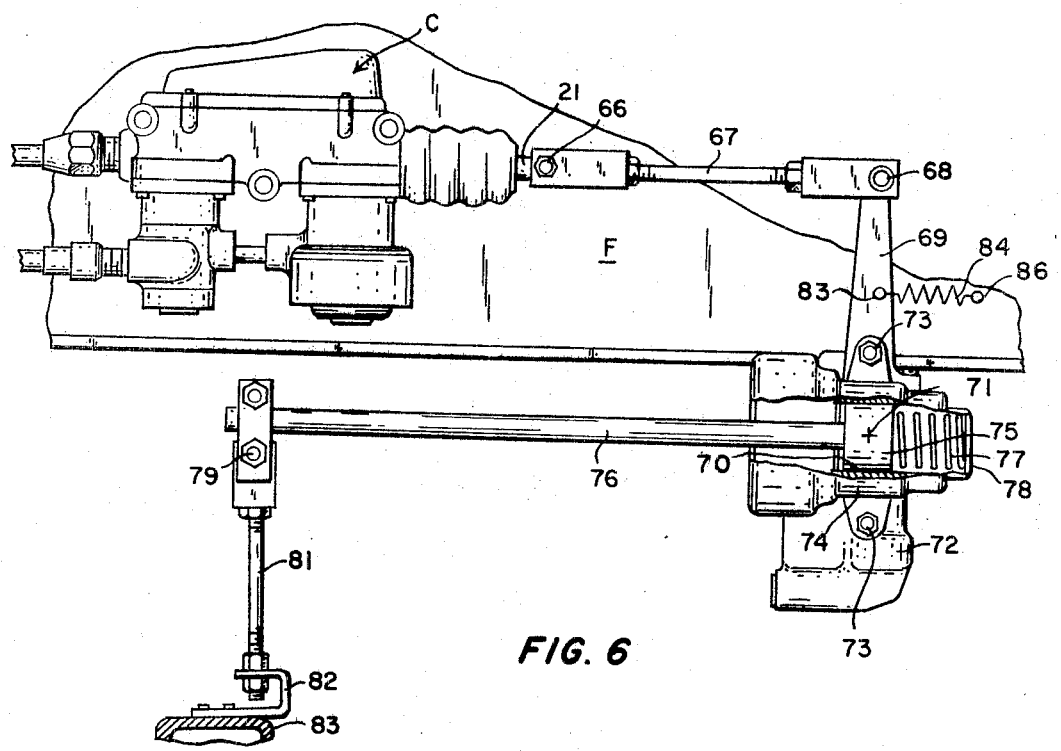
FIG. 6 is another mainly diagrammatic side elevation showing another embodiment wherein a damper is incorporated into the load sensing arm.

In the embodiment shown in FIG. 6, reciprocable control rod 21 of the control unit C is connected by a pivot 66 to one end of a link 67 that is pivotally connected at its other end at 68 to the upper end of a lever 69 mounted for rocking movement about a generally horizontal axis 71. Lever 69 is preferably suitably pivotally mounted by means (not shown) on a rotational control damping device indicated at 72 carried by the vehicle chassis, and the purpose of the damping device which may be of any conventional construction such as a rotary vane type shock absorber is to control rotation of lever 69 about pivot 71.

Secured upon the lower end of lever 69 as by bolts 73 is a casing 74 wherein is longitudinally slidably mounted in guide 70 a cylindrical block 75 fixed on the end of a spring rod 76 corresponding to rod 59 in FIG. 1. A strong compression spring 77 extends between block 75 and the rear wall 78 of casing 74. This spring acts like coil 62 to absorb road shocks. The forward end of rod 76 is pivotally connected at 79 to the upper end of a substantially vertical motion transmitting arm 81 that has its lower end secured through a resilient clip 82 to a vehicle axle 83. Arm 81 is generally centered with axle 83. Spring rod 59 is flexible to absorb rapid shocks due to the axle rise and fall because of road conditions, so that these shocks are not transmitted to displace rod 21 and therefore do not affect control of the brakes in accord with the vehicle load.

When there is relative vertical movement between the frame F and axle 83, rod 76 will rock to rock lever arm 69 about pivot 71 and displace control rod 21 as in the earlier embodiment. In the FIG. 6 embodiment the rocking movement of lever arm 69 is damped by the device at 72 to eliminate response to rapid rise and fall of the axle due to road bumps and holes.

The embodiment of FIG. 6 also includes a fail safe feature diagrammatically illustrated as a spring 84 anchored at opposite ends to lever 69 at 85 and to the frame at 86. This spring, which is tensioned during assembly, biases lever 69 clockwise to automatically place the control unit C in maximum braking condition should the mechanism 76, 81 break or become ineffective, operation being substantially the same as in the FIGS. 1–5 embodiment.

The invention may be embodied in other specific forms without departing from the spirit or essential characteristics thereof. The present embodiments are therefore to be considered in all respects as illustrative and not restrictive.

What is claimed and desired to be secured by Letters Patent is:

1. In load responsive brake control apparatus for a vehicle having a frame supported by spring suspension means on an axle having ground engaging wheels and wherein the vertical distance between the frame and axle varies with load on the vehicle, a fluid pressure responsive brake system for the vehicle mounted on said frame, a brake control unit for said system comprising means responsive to fluid pressure developed in said brake system operable to open valve means for connecting said system to operate the vehicle brakes, a spring-loaded piston movable in a cylinder and made responsive at one side to fluid pressure on the downstream side of said valve means, said piston through variable lever mechanism operatively connected thereto and to actuating means for said valve means exerting a restoring force on said actuating means whereby said valve means recloses when the fluid pressures in the brake system and on the downstream side of said valve means are in a predetermined ratio, a reciprocable control rod connected to said variable lever mechanism and projecting from said control unit, lever means pivotally connected to the frame for rocking about a fixed axis and directly pivotally connected to said control rod, motion transmitting mechanism connected to said axle for positive movement therewith and to said lever means for transforming increased or decreased vertical displacement between the axle and frame in response to a change in the vehicle load to rocking movement of said lever means about said axis to displace said control rod to vary the effective leverage of said lever mechanism and correspondingly modify the action of said brake control unit to modify the relative restoring force exerted on the valve actuating means and thereby said ratio according to vehicle load, said motion transmitting mechanism comprising road shock absorbing means operative to isolate said brake control unit from sudden and transient shocks which tend to move said frame and axle toward or away from each other, and resilient means biasing said lever means to rock in a predetermined direction about its axis in the event said motion transmitting mechanism becomes ineffective to control said lever means.

2. In the load responsive brake control apparatus defined in claim 1, means providing a frame pivot on which said lever means is mounted, and said resilient biasing means comprising a spring biasing said lever means to rock in a predetermined direction about said pivot.

3. In the load responsive brake control apparatus defined in claim 1, said control rod extending longitudinally of the vehicle, and said motion transmitting mechanism comprising a bell crank rockable about a fixed pivot on the frame and having one arm pivotally connected to said control rod and its other arm extending longitudinally of the vehicle, an arm extending upward from said axle and means pivotally interconnecting said arm and said other arm of the bell crank.

4. In the load responsive brake control apparatus defined in claim 1, said resilient means being automatically operative when said motion transmitting mechanism breaks or similarly becomes ineffective for displacing said control rod to a limit position to set said lever mechanism for maximum braking when the vehicle brakes are operated.

5. In the load responsive brake control apparatus defined in claim 1, said control unit including a housing having inlet and delivery ports and a chamber interconnecting said ports, the pressure-responsive valve actuating means consisting of a piston movable axially in said chamber and displacement of which actuates a combined inlet exhaust valve structure first to close off a connection between the delivery port and an exhaust port and thereafter to connect said delivery port to the inlet port.

6. In the load responsive brake control apparatus defined in claim 5, said valve actuating piston being of hollow construction on said combined valve structure being of dumb-bell form, one end element of the valve structure cooperating with a seating in the piston to control fluid flow through the piston while the other end element of said combined valve structure cooperates with a seating around the exhaust port.

7. In the load responsive brake control apparatus defined in claim 6, the two pistons being disposed on parallel axes and having operative connection with opposite ends of an oscillatable lever fulcrummed intermediate its ends in said unit, and displacement of said control unit rod in response to the beam thereby varying the relative lengths of its two arms.

8. In the load responsive brake control apparatus defined in claim 7, the connection between the spring loaded piston and the related end of said lever including a yoke which permits free "no-load" movement of the lever during the initial build-up of braking pressure.

9. In load responsive brake control apparatus for a vehicle having a frame supported by suspension means on an axle having ground engaging wheels and wherein the vertical distance between the frame and axle varies with load on the vehicle, a control unit for a fluid pressure responsive brake system of the vehicle mounted on said frame, a reciprocable operating rod projecting from said unit, lever means pivotally connected to the frame for rocking about a fixed axis and directly connected to said rod, motion transmitting mechanism connected to said axle for position displacement therewith and to said lever means for transforming relative vertical displacement between the axle and frame in response to a change in the vehicle load to rocking movement of said lever means about said axis to displace said control rod and correspondingly modify the action of said brake control unit, said motion transmitting mechanism comprising road shock absorbing means operative to isolate said control unit rom sudden and transient shocks which tend to move said frame and axle toward or away from each other, and resilient means biasing said lever means to rock in a predetermined direction about its axis in event said mechanism becomes ineffective to control said lever means, said motion-transmitting mechanism comprising an arm extending upward from said axle, and said shock absorbing means comprising a relatively stiff spring rod extending generally longitudinally of said vehicle and having one end connected to said arm for positive displacement therewith and the other end connected to said lever means.

10. In the load responsive brake control apparatus defined in claim 9, said lever means being a bell crank having opposite ends pivotally connected to said stiff spring rod and said operating rod, and said resilient biasing means comprising coil spring means positioned around the pivot axis of said bell crank and having its ends connected to said frame and said bell crank, said coil spring means biasing said bell crank to rock in a predetermined direction about its pivot axis in event said mechanism becomes ineffective to control said bell crank.

References Cited
UNITED STATES PATENTS 2,987,346  6/1961  Wrigley _____ 303—22 XR
3,285,673  11/1966  Dobrikin _____ 303—22

MILTON BUCHLER, Primary Examiner
J. J. McLAUGHLIN, Jr., Assistant Examiner

U.S. Cl. X.R.
188—195